United States Patent [19]
> Wall

[11] 4,102,277
[45] Jul. 25, 1978

[54] INCINERATION OF LIME-CONDITIONED SEWAGE SLUDGE WITH HIGH SULFUR FUEL

[75] Inventor: Clarence J. Wall, Westport, Conn.

[73] Assignee: Dorr-Oliver Incorporated, Stamford, Conn.

[21] Appl. No.: 756,169

[22] Filed: Jan. 3, 1977

[51] Int. Cl.² .............................................. F23G 5/02
[52] U.S. Cl. .................................. 110/342; 110/221; 110/245; 44/1 D
[58] Field of Search ................ 110/8 F, 8 R, 1 J, 8 P, 110/15; 44/1 D

[56] References Cited
U.S. PATENT DOCUMENTS

| | | | |
|---|---|---|---|
| 3,717,700 | 2/1973 | Robison et al. | 110/1 J |
| 3,907,674 | 9/1975 | Roberts et al. | 110/8 F |
| 3,941,552 | 3/1976 | Cottell | 110/1 J |
| 3,949,684 | 4/1976 | Copeland | 110/1 J |

*Primary Examiner*—Kenneth W. Sprague
*Attorney, Agent, or Firm*—Harold M. Snyder; Burtsell J. Kearns

[57] ABSTRACT

Sewage sludge is dewatered with the aid of lime and then incinerated using high sulfur fuel. During incineration the lime reacts with the sulfur in the fuel and with oxygen to form the solid $CaSO_4$ for disposal and thus prevent formation of the pollutant, $SO_2$ gas. High sulfur coal may be crushed and used as an additional filter aid or sludge conditioner and the serve as the auxiliary fuel during incineration.

9 Claims, 2 Drawing Figures

INCINERATION OF LIME-CONDITIONED SEWAGE SLUDGE WITH HIGH SULFUR FUEL

This invention is directed to a non-polluting process for incineration of sewage sludge using a high sulfur fuel.

The purpose of a sewage sludge incineration process is to completely consume the organic matter in the sludge, leaving as a residue only an inert ash, and to perform this combustion reaction in a manner that does not produce noxious gases or objectionable odors. In carrying out this incinerator process, it is generally necessary to use some auxiliary fuel. Either natural gas or No. 2 fuel oil is the most common fuel used today for this purpose.

A dewatering procedure is normally carried out on the sludge produced as thickener underflow, to prepare the sludge for incineration. This dewatering is carried out in filters and the sludge is usually conditioned for dewatering by the use of organic polymers or inorganic chemicals to improve the dewatering properties of the sludge. Natural gas and No. 2 fuel oil are no longer plentiful and are therefore expensive at present and will likely become more expensive in the future. From an economic and/or availability standpoint it would be very advantageous to use a high sulfur coal or a high sulfur residual oil (Bunker C, No. 6, for example), containing $\frac{1}{2}\%$ or more, by weight, sulfur, as auxiliary fuel. The use of these high sulfur fuels would, however, result in pollution of the atmosphere with $SO_2$ being emitted with the incinerator stack gases.

Accordingly, it is an object of the present invention to provide a method for dewatering and incinerating sewage sludge using high sulfur fuel in which a dewatering aid reacts during incineration to eliminate polluting $SO_2$ gases from the incinerator exhaust gases.

Other objects and advantages will become apparent from the following description taken in conjunction with the accompanying drawings in which.

In accordance with the present invention lime (CaO) is used as the inorganic chemical for conditioning the sludge ahead of final dewatering. The residual lime present in the dewatered sludge feed to the incinerator reacts with the sulfur in the auxiliary fuel and with oxygen to form calcium sulfate ($CaSO_4$), eliminating any air pollution by $SO_2$ in the incinerator stack gases. It is generally convenient to add sufficient lime in the dewatering step to satisfy the lime requirement of the lime-sulfur reaction of the incineration step.

In addition, where the high sulfur fuel is coal, the coal may be crushed to a fine particle size, say −28 mesh to −150 mesh and employed as a filter aid or sludge conditioner in the final dewatering of the sludge. This fine coal is thus present in the filter cake and serves as fuel in the incineration step.

It should be noted that the raw sewage waste stream may also contain sulfur which must be neutralized in the incineration step.

Figure 1:
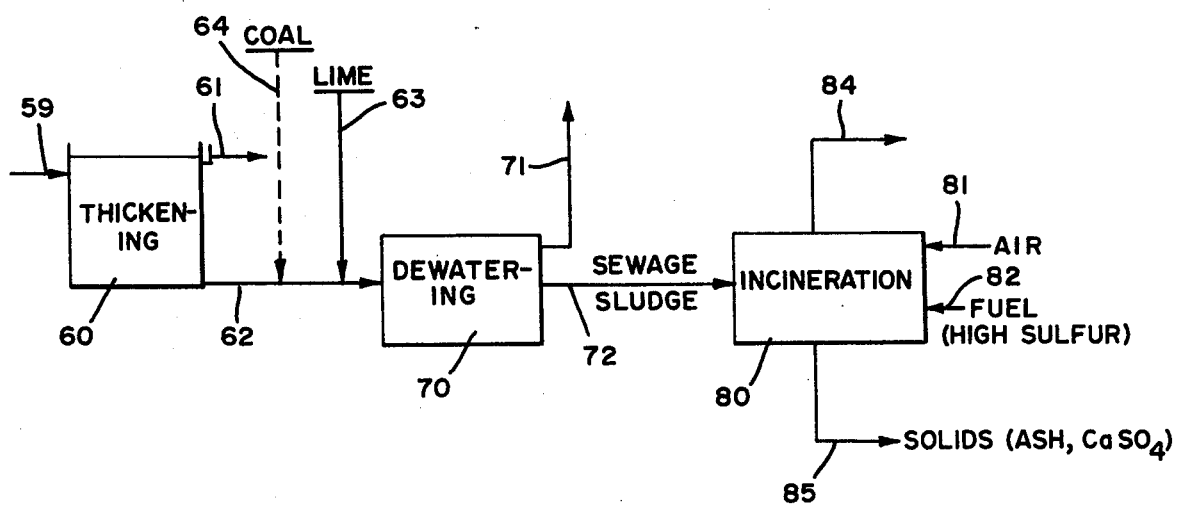
FIG. 1 is a flow diagram of the process in accordance with this invention.

Referring now to FIG. 1, the process of the invention is illustrated in the form of a flow diagram and operates upon the underflow of a thickening stage 60 and proceeds through a dewatering step 70 to the final incineration step 80. The raw sewage waste stream is introduced into the thickening stage through line 59. The overflow 61 of the thickening stage is removed from the system and disposed of by means not of concern in this process. The thickener underflow moves to the dewatering step 70 through line 62. Lime (CaO) is added to the flow in line 62 through line 63. The dewatering stage is conducted using filter presses or vacuum drum filters. Filter presses are preferred since they produce a dryer filter cake. The liquid separated in the dewatering step is conducted out of the process through line 71 for separate disposal. The sewage sludge product or filter cake is conducted to the incineration step which may be carried out in a fluidized bed reactor or in other types of incinerators; for example, the multiple hearth furnace. Air is introduced into the incinerator through line 81 and a high sulfur fuel is introduced through line 82. Combustion occurs in the incinerator at temperatures in the range from about 1300° F to 1600° F so that the organic matter in the sewage sludge is completely consumed and destroyed and a reaction between the sulfur of the fuel and the lime addition occurs as follows:

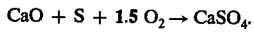

$$CaO + S + 1.5\,O_2 \rightarrow CaSO_4.$$

In general, 50% excess CaO is provided over the theoretical CaO requirement for sulfur neutralization to assure that essentially all the sulfur is reacted.

The combustion gases are removed from the incineration step through line 84 and the solids, including ash and $CaSO_4$ are removed through line 85.

Figure 2:
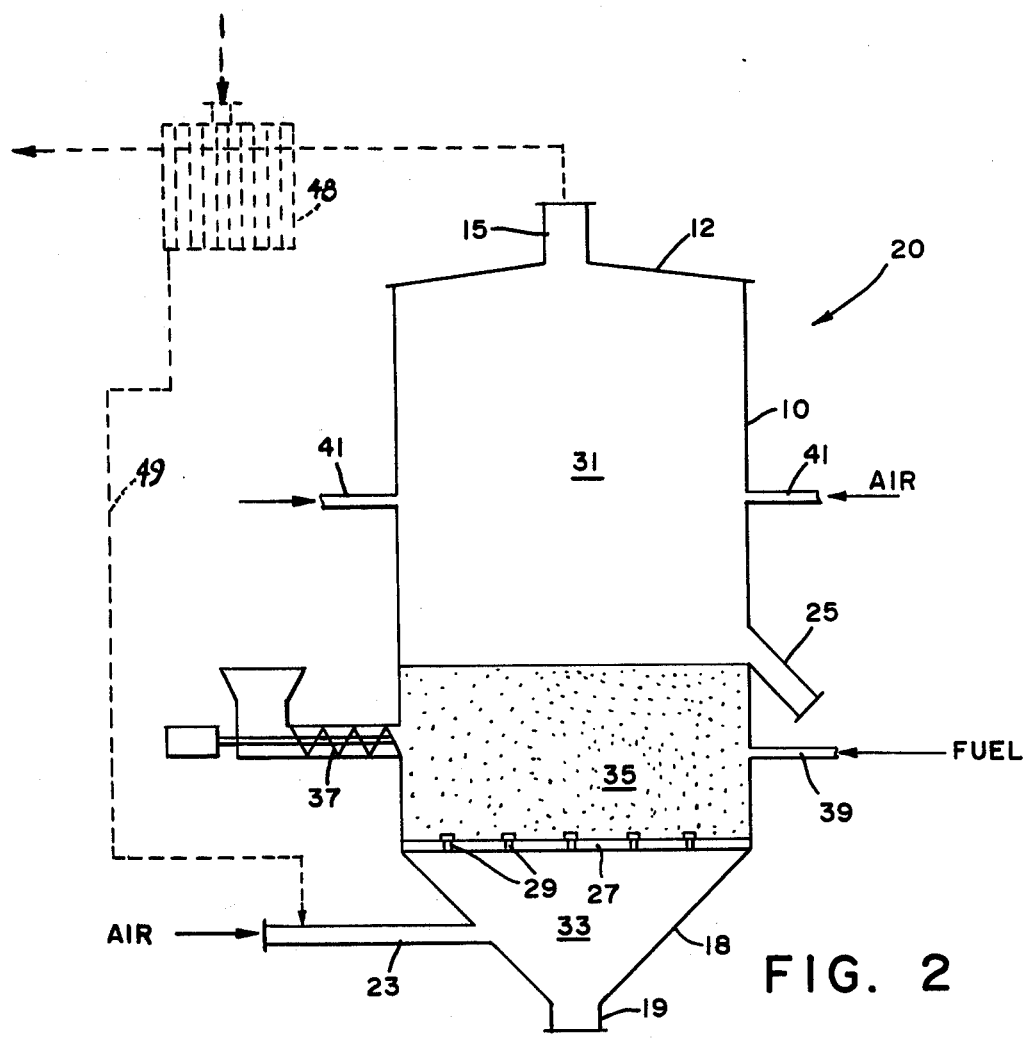
FIG. 2 is a view partially in section of a fludized bed reactor suitable for use in the process of the invention.

Referring now to FIG. 2, a fluidized bed incinerator 20 is shown as one type of reactor in which the process of the invention can be carried out. The fluidized bed reactor 20 comprises an outer shell 10 which is capped by a roof 12 in which an exhaust gas conduit 15 is provided. Conical wall 18 forms the bottom of reactor 20 and is provided with clean-out port 19. An air inlet pipe 23 is provided through which fluidizing gas is supplied to reactor 20. Within shell 10 is a horizontal constriction plate 27, having tuyeres 29 therein, which divides the reactor 20 into a reaction chamber 31 above the constriction plate 27 and a windbox 33 therebelow. The constriction plate 27 is capable of supporting a fluidized bed 35 thereon. A screw feed mechanism 37 is provided to feed dewatered sewage sludge or filter cake into reaction chamber 31. Auxiliary fuel (coal or oil, for example) may be introduced through fuel guns 39 and above-bed air may be introduced into reaction chamber 31, if desired, by means of conduits 41. In phantom, a means for providing a hot windbox is illustrated. Thus, exhaust gases from conduit 15 is routed through the heat exchanger 48. Combustion air is heated in heat exchanger 48 and forwarded to windbox 33 through lines 49 and 23. Preheated combustion air effects a saving in fuel. It will be understood that the process of the invention may be as well conducted in other types of incinerators, including multiple hearth furnaces.

For the purpose of giving those skilled in the art a better understanding of the invention, the following examples are offered

Example I

A thickener underflow containing 5% of dry solids is subjected to filtration in a filter press with CaO added as a filtration aid. The sewage filter cake is then incinerated in a hot windbox fluidized bed incinerator using coal containing 4% sulfur. The amount of CaO added to the thickener underflow is sufficient to satisfy the requirement for a filtration aid as well as the requirement for reaction with the sulfur contained in the coal and in the sludge, taking into consideration the fact that some of the lime is removed from the process in solution with the filtrate. Thus, where 16% dry solids are present in the filter cake feed to the incinerator, the required CaO is determined as follows per 100 pounds of dry sewage sludge solids:

| Pounds CaO for sludge conditioning | 10 |
|---|---|
| Pounds CaO dissolved in filtrate water | 2.2 |
| Pounds coal required | 66 |
| Pounds sulfur in coal | 2.6 |
| Pounds sulfur in sewage sludge | 1.0 |
| Total sulfur (pounds) | 3.6 |
| Theoretical CaO requirement for sulfur (pounds) | 6.3 |
| Pounds CaO for 50% excess CaO | 9.45 |
| Pounds total CaO required | 11.65 |

With the addition of 11.65 pounds of CaO per 100 pounds of dry sewage sludge solids, the filtration is quite effective and in the subsequent incineration the amount of $SO_2$ present in the stack gas is at an acceptably low level; i.e., about 10 ppm.

Example II

A thickener underflow similar to that of Example I is dewatered and incinerated in a cold windbox fluidized bed incinerator using coal containing 2% sulfur. With 20% dry solids present in the filter cake feed to the incinerator, the required CaO per 100 pounds of dry sewage sludge is determined.

| Pounds CaO for sludge conditioning | 10 |
|---|---|
| Pounds CaO dissolved in filtrate | 2.5 |
| Pounds coal required | 87 |
| Pounds sulfur in coal | 1.7 |
| Pounds sulfur in sewage sludge (1%) | 1.0 |
| Total sulfur (pounds) | 2.7 |
| Theoretical CaO required for sulfur | 4.7 |
| Pounds CaO for sulfur at 50% excess | 7.05 |
| Pounds total CaO required | 9.55 |

In this example, the amount of CaO added as filtration aid satisfies the requirement for reaction with the sulfur. Again, the filtration is effective and the $SO_2$ present in the stack gas is less than 10 ppm.

Although the present invention has been described with particular reference to preferred embodiments, it will be apparent to those skilled in the art that variations and modifications may be made without departing from the essential spirit and scope of the invention. It is intended to include all such variations and modifications.

I claim:

1. An economical, non-polluting process for the disposal of a sewage waste stream in which the waste stream is dewatered and the sludge formed thereby is incinerated, comprising the steps of;
    a. adding a quantity of lime to the sewage waste stream sufficient to function as a filtering aid,
    b. dewatering the sewage waste stream by filtering to form sludge filter cake containing a relatively large amount of lime therein,
    c. incinerating the sludge filter cake using a high-sulfur fuel as auxiliary fuel at a temperature at which the sulfur present in the fuel and in the sludge filter cake reacts with the lime in the sludge filter cake and with oxygen to produce $CaSO_4$ and
    d. removing the $CaSO_4$ with the solids produced by the incineration operation for disposal.

2. The process of claim 1 wherein the quantity of lime added to said sewage waste stream is at least 10 pounds per 100 pounds of dry solids in said filter cake.

3. The process of claim 1 wherein the quantity of lime present in said filter cake is 50% in excess of the theoretical requirment for reaction with the sulfur present during incineration.

4. The process of claim 1 wherein the auxiliary fuel is a high-sulfur oil containing ½%, by weight, or more of sulfur.

5. The process of claim 1 wherein the auxiliary fuel is a high-sulfur coal containing ½%, by weight, or more of sulfur.

6. The process of claim 1 wherein the incineration is conducted as a fluidized bed reaction.

7. The process of claim 6 wherein the incineration is carried out in the temperature range from about 1200° F to about 1600° F.

8. The process of claim 1 wherein the dewatering step is a filter press operation.

9. An economical, non-polluting process for the disposal of a sewage waste stream in which the waste stream is dewatered and the sludge produced thereby is incinerated, comprising the steps of;
    a. adding lime to said sewage waste stream as a filtering aid in the amount of at least 10 pounds per 100 pounds of dry solids in the filter cake produced in the dewatering step hereafter,
    b. dewatering the sewage waste stream in a filter press to form sludge filter cake containing lime in an amount at least 50% in excess of that required for reaction with the sulfur present in the incineration step hereafter,
    c. incinerating the sludge filter cake in a fluidized bed reactor at a temperature from about 1200° F up to about 1600° F using a high-sulfur auxiliary fuel whereby the sulfur present during incineration reacts with the lime in the filter cake and with oxygen to produce $CaSO_4$ and
    d. removing the $CaSO_4$ with the other solids, including ash, produced during incineration.

* * * * *